(12) United States Patent
Cai et al.

(10) Patent No.: US 10,282,366 B2
(45) Date of Patent: May 7, 2019

(54) MULTI-DIMENSIONAL DECOMPOSITION COMPUTING METHOD AND SYSTEM

(71) Applicant: TENCENT TECHNOLOGY (SHENZHEN) COMPANY LIMITED, Shenzhen, Guangdong Province (CN)

(72) Inventors: Fu Han Cai, Shenzhen (CN); Hao Li, Shenzhen (CN); Lei Wu, Shenzhen (CN); Wei-Ji Zeng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 521 days.

(21) Appl. No.: 15/049,471

(22) Filed: Feb. 22, 2016

(65) Prior Publication Data

US 2016/0171074 A1    Jun. 16, 2016

Related U.S. Application Data

(63) Continuation of application No. PCT/CN2014/085382, filed on Aug. 28, 2014.

(30) Foreign Application Priority Data

Aug. 28, 2013    (CN) .......................... 2013 1 0381567

(51) Int. Cl.
*G06F 17/30*    (2006.01)
*G06F 16/28*    (2019.01)

(52) U.S. Cl.
CPC ................................. *G06F 16/283* (2019.01)

(58) Field of Classification Search
None
See application file for complete search history.

(56) References Cited

U.S. PATENT DOCUMENTS 8,682,932 B2 *    3/2014    Raghavan ......... G06F 17/30958
                                                               707/798
8,799,315 B2 *    8/2014    Kutsch .............. G06F 17/30941
                                                               707/778

(Continued)

FOREIGN PATENT DOCUMENTS

CN            1955958 A        5/2007
CN          102129457 A        7/2011

(Continued)

OTHER PUBLICATIONS

Helen Pinto, Jiawei Han, Jian Pei, Ke Wang, Qiming Chen, and Umeshwar Dayal, "Multi-dimensional sequential pattern mining", Proceeding CIKM '01 Proceedings of the tenth international conference on Information and knowledge management, pp. 81-88, Nov. 5-10, 2001, ISBN:1-58113-436-3.

(Continued)

*Primary Examiner* — Thu N Nguyen
(74) *Attorney, Agent, or Firm* — Anova Law Group, PLLC (57) ABSTRACT

Disclosed is a multi-dimensional decomposition computing method and system, related to the field of multi-dimensional decomposition computing technique, applicable to performing multi-dimensional decomposition on big data to reduce computation complexity. The method executes: generating an recursion topology based on pre-processed big data; the recursion topology comprising dimension combination and recursion path among the dimension combinations; based on default fixed strategy, defining a fixed dimension combination and defining a computation path forming an optimized fixed dimension combination; based on the recursion topology, generating computation tasks; and based on the fixed dimensional combination and the computation path of the optimized fixed dimension combination, activating the computation tasks, computing the computation tasks and obtain- (Continued)

ing computing results. The disclosed solution is applicable to multi-dimensional decomposition.

15 Claims, 7 Drawing Sheets

(56) References Cited

U.S. PATENT DOCUMENTS

| | | | |
|---|---|---|---|
| 2005/0050191 A1* | 3/2005 | Hubis | H04L 67/1097 709/223 |
| 2010/0106729 A1 | 4/2010 | Pan et al. | |
| 2012/0284280 A1 | 11/2012 | Kumar | |
| 2014/0181292 A1* | 6/2014 | Venkataswami | H04L 41/0677 709/224 |

FOREIGN PATENT DOCUMENTS

| | | |
|---|---|---|
| CN | 102929987 A | 2/2013 |
| CN | 102982103 A | 3/2013 |

OTHER PUBLICATIONS

The State Intellectual Property Office of the People's Republic of China (SIPO) Office Action 1 for 201310381567.3 dated Aug. 30, 2018 6 Pages (including translation).

\* cited by examiner

| key<br>date_dimension-value | row<br>index: index-value |
|---|---|
| 20130601_10_1_010 | 101:200<br>102:108 |
| 20130601_10_2_010 | 101:187<br>102:103 |
| ...... | ...... |

MULTI-DIMENSIONAL DECOMPOSITION COMPUTING METHOD AND SYSTEM

CROSS REFERENCE TO RELATED APPLICATION

This application is a continuation of International Application No. PCT/CN2014/085382 filed Aug. 28, 2014, which claims priority to Chinese Patent Application CN2013103815673 filed Aug. 28, 2013.

BACKGROUND

1. Field of the Technology

The present invention relates to the field of multi-dimensional decomposition computing techniques, and in particular to a method and system of multi-dimensional decomposition computation.

2. The Related Arts

In known techniques, the multi-dimensional decomposition system usually stores data based on a relational database. The relational database is a data organization comprising a plurality of two-dimensional tables and the links between one two-dimensional table and another. When using the known technique to compute the multi-dimensional decomposition, a multi-dimensional combination result matching a user's data request is computed by using the plurality of two-dimensional tables and the links among the plurality of two-dimensional tables according to the user's data request.

However, when the known technique is applied to multi-dimensional decomposition computation, the computation complexity is high and the amount of data processed is small because of the relational database.

SUMMARY

The embodiments of the present invention provide a multi-dimensional decomposition computing method and system, applicable to perform multi-dimensional decomposition of big data to reduce the computation complexity.

In an aspect, an embodiment provides a multi-dimensional decomposition computing method, which comprises:

based on pre-processed big data, generating an recursion topology, the recursion topology comprising a plurality of dimension combinations and recursion paths between the plurality of dimension combinations, the dimension combination comprising an attribute name of each dimension and a data of the pre-processed data corresponding to the attribute name;

based on default fixed strategy, defining a fixed dimension combination and defining a computation path forming an optimized fixed dimension combination;

based on the recursion topology, generating computation tasks; and based on the fixed dimensional combination and the computation path of the optimized fixed dimension combination, activating the computation tasks, computing the computation tasks and obtaining computing results.

In another aspect, an embodiment of the present invention provides a multi-dimensional decomposition computing system, which comprises: a computing decision module, a computing control module and a dimension combination generation module;

the computing decision module is for generating an recursion topology based on pre-processed big data, the recursion topology comprises a plurality of dimension combinations and recursion paths between the plurality of dimension combinations, the dimension combination comprises an attribute name of each dimension and a data of the pre-processed data corresponding to the attribute name;

the computing decision module is also for defining a fixed dimension combination and defining a computation path forming an optimized fixed dimension combination based on default fixed strategy;

the computing control module is for generating computation tasks based on the recursion topology;

the computing control module is also for activating the computation tasks based on the fixed dimensional combination and the computation path of the optimized fixed dimension combination; and the dimension combination generation module is for computing the computation tasks and obtaining computing results.

The embodiments of the present invention provide a multi-dimensional decomposition computing method and system: by generating an recursion topology based on pre-processed big data; based on default fixed strategy, defining a fixed dimension combination and defining a computation path forming an optimized fixed dimension combination; based on the recursion topology, generating computation tasks; and based on the fixed dimensional combination and the computation path of the optimized fixed dimension combination, activating the computation tasks, computing the computation tasks and obtaining computing results. Compared to the known technique in multi-dimensional decomposition, where the computation complexity is high and the amount of data processed is small because of the relational database, the present invention can compute the computation tasks based on the fixed dimension combination and the computation path of the optimized fixed dimension combination so as to perform multi-dimensional decomposition on the big data and reduce the computation complexity.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art; other drawings may be easily obtained from these drawings without paying any creative effort. In the drawings.

DETAILED DESCRIPTION OF THE PREFERRED EMBODIMENTS

The following refers to drawings in the embodiments to provide a clear and complete description of the techniques disclosed in the embodiments. Apparently, the embodiments described below show only some exemplary embodiments, instead of all embodiments, of the present invention. Based on these embodiments of the present invention, all other embodiments which may be easily obtained by those having ordinary skills in the art without paying any creative effort all also within the scope of the present invention.

Figure 8:
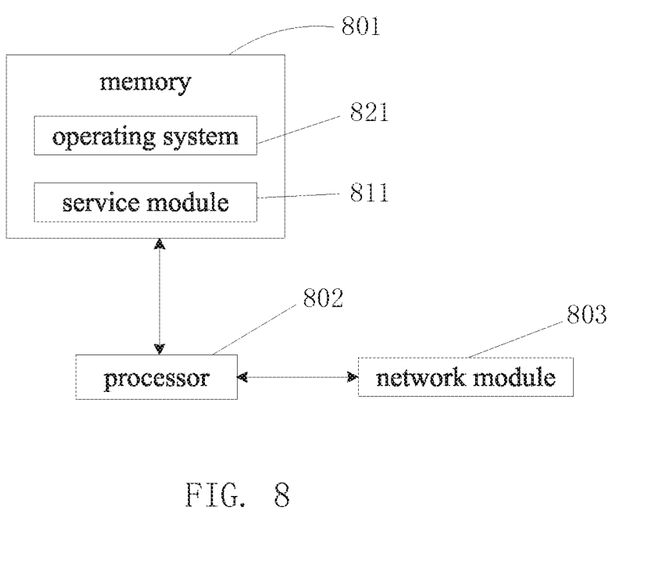
FIG. 8 is a block diagram of a server of the multi-dimensional decomposition computing systems of the present invention.

FIG. 8 illustrates a server of multi-dimensional decomposition computing systems of the present invention, for executing multi-dimensional decomposition computing methods of the present invention. As shown in FIG. 8, the server includes a memory 801, one or more processing units (CPU's) 802, and a network module 803. It should be appreciated that the server shown in FIG. 8 is only one example of a server, and that the server may have more or fewer components that shown in FIG. 8, or a different configuration of components. The various components shown in FIG. 8 may be implemented in hardware, software or a combination of both hardware and software, including one or more signal processing and/or application specific integrated circuits.

The memory 801 may store software programs and modules, such as the program instructions/modules corresponding to the multi-dimensional decomposition computing systems and the multi-dimensional decomposition computing methods according to embodiments of the present invention. The one or more processors 802 run various software programs and/or sets of instructions stored in the memory 801 to perform various functions for the server and to process data, so as to implement the multi-dimensional decomposition computing methods according to the embodiments of the present invention.

The memory 801 may include high speed random access memory and may also include non-volatile memory, such as one or more magnetic disk storage devices, flash memory devices, or other non-volatile solid state memory devices. In some embodiments, the memory 801 may further include storage remotely located from the one or more processors 802, for instance network attached storage accessed via network module 803 and a communications network (not shown) such as the Internet, intranet(s), Local Area Networks (LANs), Wireless Local Area Networks (WLANs), Storage Area Networks (SANs) and the like, or any suitable combination thereof. Further, the program instructions/modules may include a service module 811 and an operating system 821. The operating system 821 (e.g., Darwin, RTXC, LINUX, UNIX, OS X, WINDOWS) includes various software components and/or drivers for controlling and managing general system tasks (e.g., memory management, storage device control, power management, etc.) and facilitates communication between various hardware and software components. The service module 811 runs on the basis of the operating system 821, monitors requests from network via network services of the operating system 821, completes corresponding data processing according to the requests, and returns processing results to a client. That is, the service module 811 is for providing network services to the client.

The network module 803 receives and sends network signals. The network signals may be wired signals or wireless signals. The network module 803 converts electrical signals/optical signals/electromagnetic waves and communicates with other devices such as other servers or routers. As such, the server may receive a web request through the network module 803 and send data to the client using the network module 803.

Figure 1:
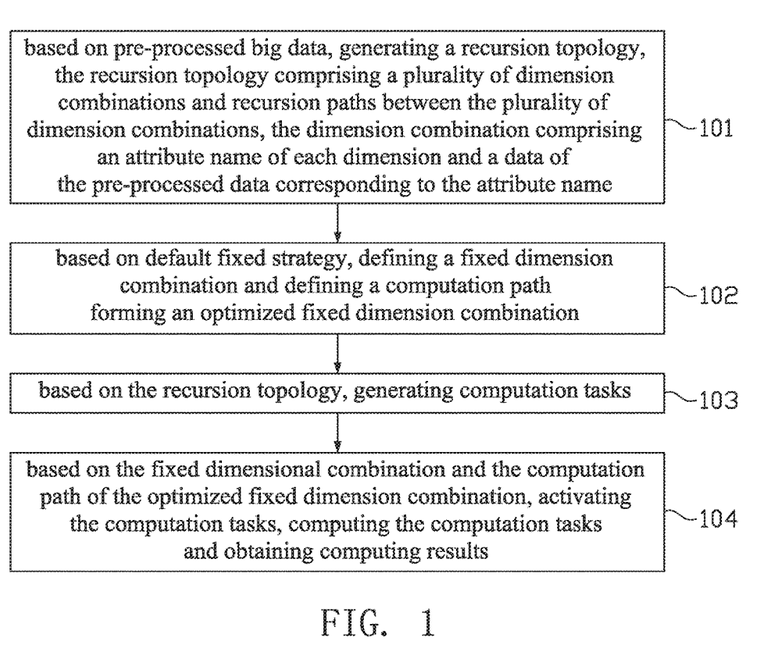
FIG. 1 is a flowchart of a multi-dimensional decomposition computing method according to an embodiment of the present invention.

An embodiment of the present invention provides a multi-dimensional decomposition computing method, and the method can be executed on a server (e.g., the server shown in FIG. 8), and more specifically, a multi-dimensional decomposition computing system. The method comprises:

Step 101: based on pre-processed big data, generating an recursion topology, the recursion topology comprising a plurality of dimension combinations and recursion paths between the plurality of dimension combinations, the dimension combination comprising an attribute name of each dimension and a data of the pre-processed data corresponding to the attribute name.

Optionally, before generating the recursion topology, pre-processing on received big data is performed so as to obtain normalized pre-processed big data that is suitable for subsequent computing.

Optionally, the received big data may be a whole-day flow data of a user, or a flow data of a default duration defined by the user. The default duration can be defined according to past experience, such as, a week, 8 days, and so on. The received big data can be big data of the order of magnitude of terabytes (TB).

Optionally, the big data can be uploaded by the user through an interface, or the big data may be of a text format provided by the user.

Optionally, the big data may comprise user identification, data source, and so on. When generating recursion topology based on the pre-processed big data, the user identification in the pre-processed big data may be used to obtain user related information, such as, user's address, user's age, user's gender, and so on, and the data source in the big data may be used to obtain the number of times a user logs in, and so on. Based on the above information, a dimension combination is obtained. The attribute names of each dimension in the dimension combination may be user address, user age, user gender, number of logins, and so on. The data corresponding to the attribute name is the attribute value. For example, the user address may be Hung-Jou, the user age may be 30, the user gender may be female, and the number of logins may be 1, and so on. Based on the above information and the hierarchy of the attributes, an recursion topology may be generated. The hierarchy of the attributes may be a relation between attribute and attribute. For example, when the user address is Hung-Jou, the Hung-Jou may be considered belonging to Jian-Jie-Hu region so as to obtain a higher level attribute, i.e., Jian-Jie-Hu region.

Figure 2:
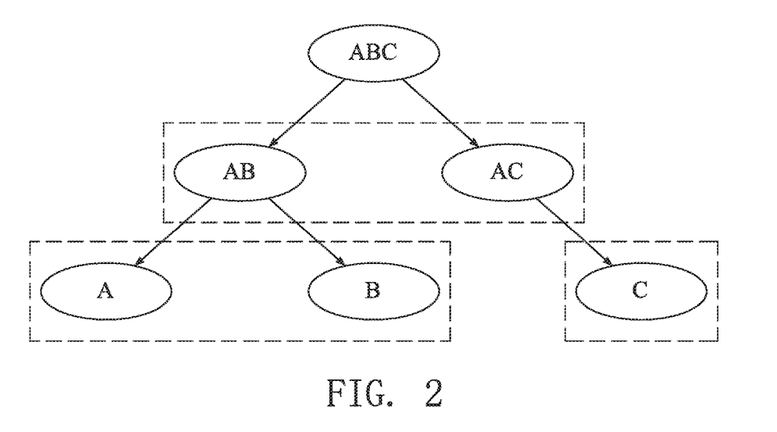
FIG. 2 is a schematic view showing the recursion topology according to an embodiment of the present invention.

Optionally, as shown in FIG. 2, the ABC in the figure is the big data received to be processed, wherein ABC may be a dimension view comprising three dimensions. The second level comprises two dimension combinations View_AB and View_AC obtained from View_ABC, and the third level comprises View_A and View_B obtained from View_AB, and View_C obtained from View_AC, wherein the arrow of the dimension combination represents the recursion path between the attributes.

Step 102: based on default fixed strategy, defining a fixed dimension combination and defining a computation path forming an optimized fixed dimension combination.

The default fixed strategy is for indicating query data source of the fixed dimension combination.

The fixed dimension combination is a default combination of certain dimensions, for example, the default combination of the three dimensions of user age, user gender, and user address; or, the default combination of the two dimensions of user age, and user gender.

The computation path of the optimized fixed dimension combination may be the computation path with minimum cost to obtain the required dimension combination.

Optionally, when defining the computation path of the optimized fixed dimension combination based on the default fixed strategy, the dimension combination at the path end is the fixed dimension combination.

Step 103: based on the recursion topology, generating computation tasks.

Optionally, the computation tasks comprising each dimension combination is generated based on the dimension combination of the recursion topology and the recursion path between the dimension combinations. It should be noted that the computation task is to compute each dimension combination, and each dimension corresponds to an attribute.

Step 104: based on the fixed dimensional combination and the computation path of the optimized fixed dimension combination, activating the computation tasks, computing the computation tasks and obtaining computing results.

Optionally, when computing the computation tasks, the computation path of the optimized fixed dimension combination is obtained and then the computation task is activated based on the fixed dimension combination involved in the computation path of the optimized fixed dimension combination so as to reduce the amount of the computation of the dimension combination greatly. Optionally, the high level dimension combination (TopView) is first computed, wherein the TopView is a dimension combination directly generated from the received or pre-processed big data, such as, View_AB and View_AC of FIG. 2 as TopView. Then, other views are computed based on the recursion path.

The embodiment of the present invention provides a multi-dimensional decomposition computing method: by generating an recursion topology based on pre-processed big data; based on default fixed strategy, defining a fixed dimension combination and defining a computation path forming an optimized fixed dimension combination; based on the recursion topology, generating computation tasks; and based on the fixed dimensional combination and the computation path of the optimized fixed dimension combination, activating the computation tasks, computing the computation tasks and obtaining computing results. As such, the present invention can compute the computation tasks based on the fixed dimension combination and the computation path of the optimized fixed dimension combination so as to perform multi-dimensional decomposition on the big data and reduce the computation complexity.

Figure 3A:
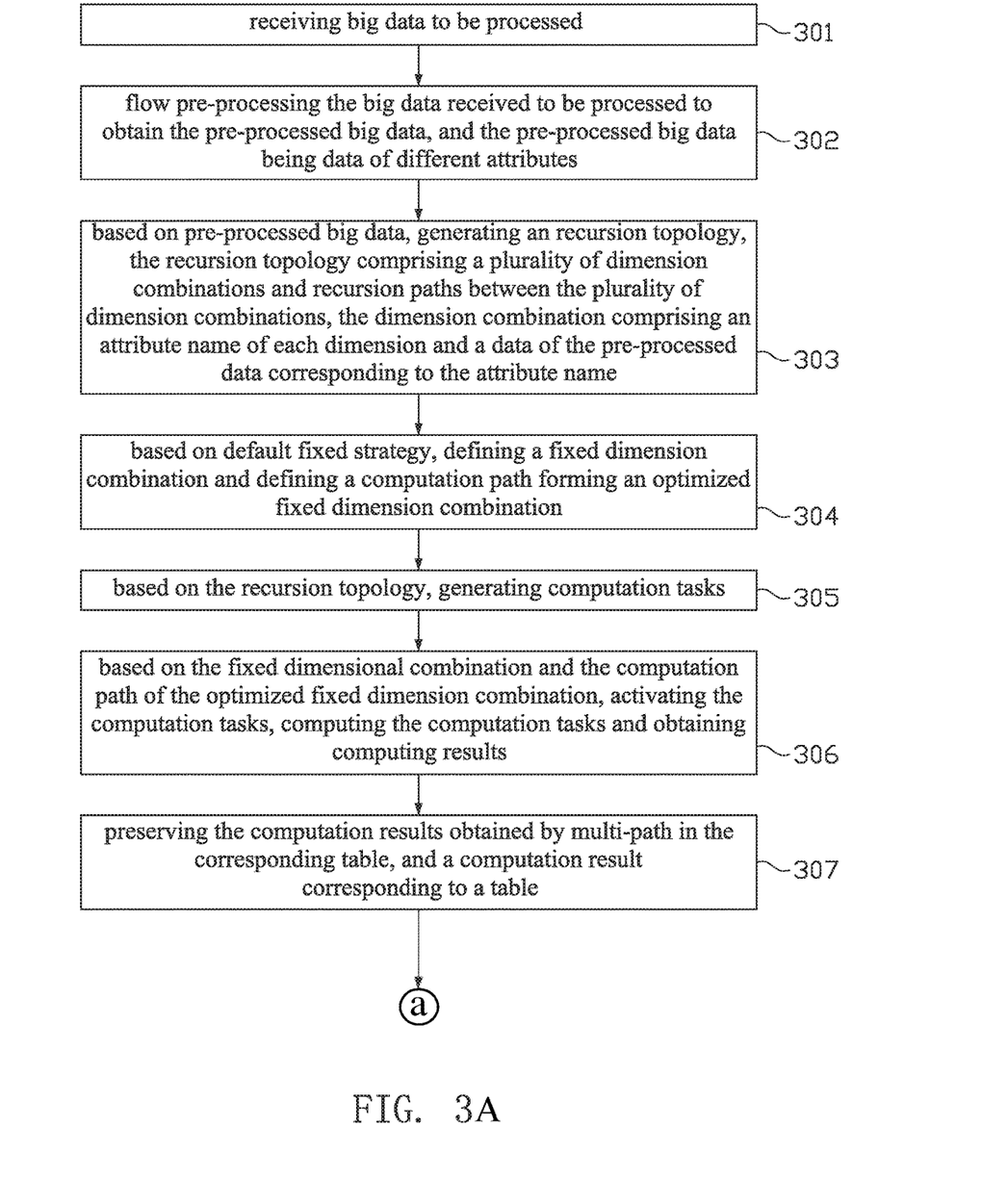
FIG. 3A and FIG. 3B together illustrate a flowchart of a multi-dimensional decomposition computing method according to another embodiment of the present invention.
Figure 3B:
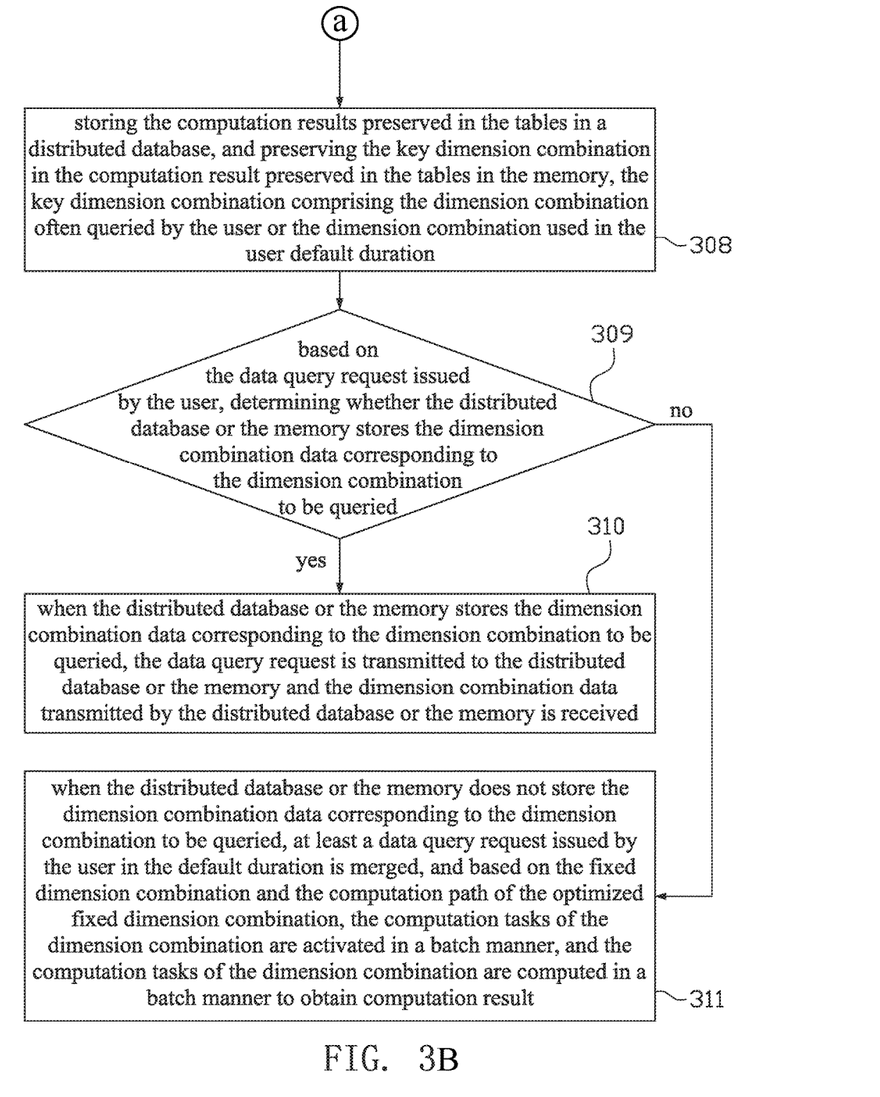

Another embodiment of the present invention provides a multi-dimensional decomposition computing method, and the method can be executed on a server (e.g., the server shown in FIG. 8), and more specifically, a multi-dimensional decomposition computing system. As shown in FIG. 3A and FIG. 3B, the method comprises:

Step 301: receiving big data to be processed.

Optionally, the big data can be uploaded by the user through an interface, or the big data may be of a text format provided by the user.

The received big data can be big data of the order of magnitude of terabytes (TB).

The specific description of the big data to be processed may refer to step 101, and will not be repeated here.

Step 302: flow pre-processing the big data received to be processed to obtain the pre-processed big data, and the pre-processed big data being data of different attributes.

Optionally, the flow pre-processing is performed on the big data received to be processed to obtain normalized pre-processed big data that is suitable for subsequent computing.

The step comprises:

A. based on the big data to be processed and the default selection pre-processing rules, the pre-processing rule corresponding to the big data to be processed is identified.

Optionally, the default selection pre-processing rules is to designate which pre-processing rules are used to pre-process the big data to be processed. Optionally, the big data to be processed may be a received whole-day data of a user, and the default pre-processing rule 1 may be used for processing. The pre-processing rule 1 may be to filter the illegitimate field of the big data to be processed. Or, the he big data to be processed may be a received data of a user in a default duration, and the default pre-processing rule 2 may be used for processing. The pre-processing rule 2 may be to group the big data to be processed. Based on the time to obtain the data of the user of each day, and then to filter the illegitimate field of each group.

B. based on the default pre-processing rule, the cleansing processing is performed on the big data to be processed to obtain a first processed data.

Optionally, based on the above default pre-processing rule, perform the cleansing processing on the big data to be processed, i.e., filtering the illegitimate field in the big data to be processed.

C. based on default retrieving field rules, retrieving at least a field or at least a field combination required by the multi-dimensional decomposition from the first processed data.

Optionally, the default retrieving field rule may be required retrieved field disposed according to experience, i.e., the required dimension combination retrieved respectively from the first processed data, such as, the dimension combination required to obtain the user gender and user age, or the dimension combination required to obtain the user gender and user address, then, based on the default retrieving field rule, the two fields (user gender, and user age) are retrieved from the first processed data, and then the two fields (user gender, and user address) are retrieved from the first processed data.

D. based on the retrieved at least a field or at least a field combination, generating a wide table, and preserving the at least a field or at least a field combination in the wide table.

The wide table refers to a table storing data in a row format, i.e., each field occupying a row in the wide table for storing.

Optionally, a field combination uses a wide table to store. It should be understood that regardless of the number of the fields in a field combination, a wide table is always used to store. For example, if the retrieved field combination comprises the user gender and user age, the corresponding wide table preserves the data of user gender and user age; and if the retrieved field combination comprises the user gender and user address, the corresponding wide table preserves the data of user gender and user address.

E. compressing the at least a field or at least a field combination preserved in the wide table to obtain the pre-processed big data.

Optionally, to reduce the space of the wide table and the amount of landing data, compression is performed on the field combination preserved in the wide table, for example, a light-weight compression approach used for compression. The light-weight compression approach refers to using a smaller compression ratio to compress data. When the same amount of data is compresses with a larger compression ratio, the computation performance is poorer for the compressed data. That is, because the compression ratio is larger, more time is needed to decompress during the subsequent processing of the compressed data. As the data compressed with a light-weight compression approach shows better computation performance after compression, preferably, the light-weight compression approach is performed on the at least a field or at least a field combination preserved in the wide table to obtain the pre-processed big data.

Figure 4:
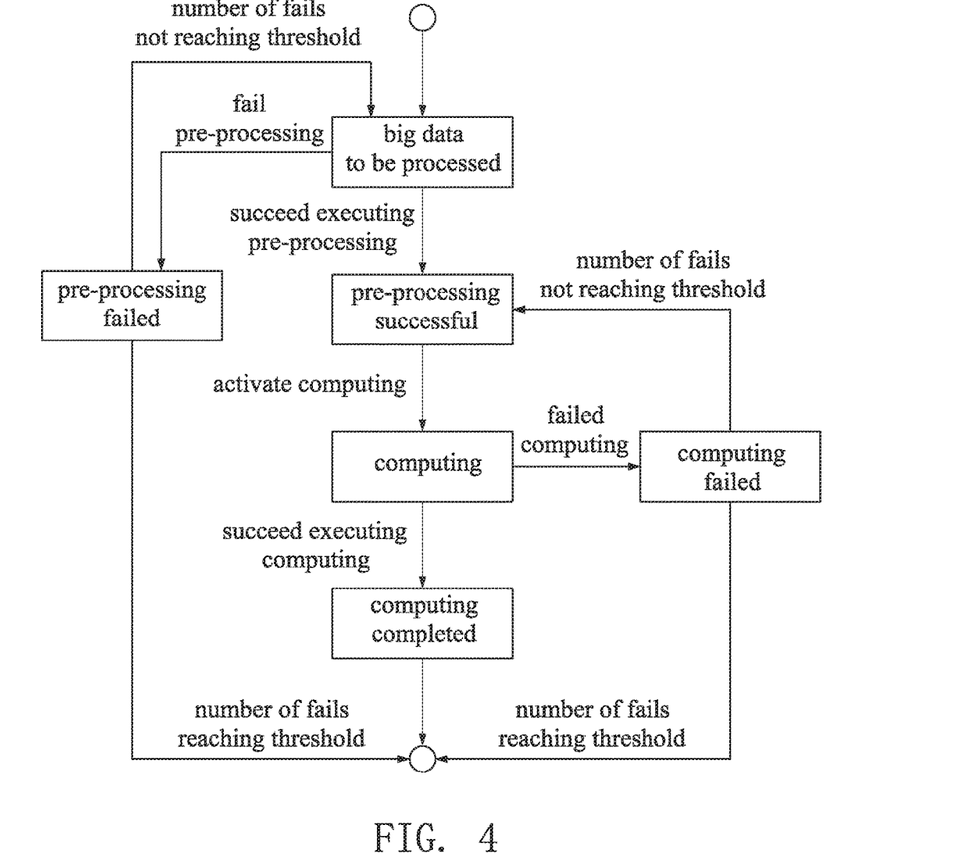
FIG. 4 is a schematic view showing the state transition of the index computation according to an embodiment of the present invention.

Further optionally, as shown in FIG. 4 of state transition of computation index, after pre-processing big data, the subsequent processing continues when the pre-processing is successful; otherwise, the pre-processing is repeated when the pre-processing fails. When the number of times of pre-processing operation reaches a default threshold and yet successful, the method terminates. On the other hand, when the number of times of pre-processing operation has yet reached a default threshold and the pre-processing is successful, the method continues.

Step 303: based on pre-processed big data, generating an recursion topology, the recursion topology comprising a plurality of dimension combinations and recursion paths between the plurality of dimension combinations, the dimension combination comprising an attribute name of each dimension and a data of the pre-processed data corresponding to the attribute name.

Optionally, the above step is the same as step 101 in FIG. 1, and the description will be not repeated here.

Step 304: based on default fixed strategy, defining a fixed dimension combination and defining a computation path forming an optimized fixed dimension combination.

Optionally, the above step is the same as step 102 in FIG. 1, and the description will be not repeated here.

Step 305: based on the recursion topology, generating computation tasks.

Optionally, the above step is the same as step 103 in FIG. 1, and the description will be not repeated here.

Step 306: based on the fixed dimensional combination and the computation path of the optimized fixed dimension combination, activating the computation tasks, computing the computation tasks and obtaining computing results.

Optionally, the step of based on the fixed dimensional combination and the computation path of the optimized fixed dimension combination, activating the computation tasks comprises:

obtaining the fixed dimension combination and identifying the fixed dimension combination to be computed; based on the fixed dimension combination to be computed, identifying a first computation path of the optimized fixed dimension combination, the computation path of the optimized fixed dimension combination comprising the first computation path of the optimized fixed dimension combination; based on the first computation path of the optimized fixed dimension combination, activating the computation tasks.

Optionally, before identifying the fixed dimension combination to be computed, a configuration information in a configuration table is obtained from a distributed database. The configuration information is the fixed dimension combination that is required to be computed, i.e., the fixed dimension combination to be computed. It should be noted that the fixed dimension combination to be computed is to obtain at least a dimension combination of the fixed dimension combination. The first computation path of the optimized fixed dimension combination is the optimized computation path related to the fixed dimension combination to be computed, that is, the minimum cost when computing the fixed dimension combination to be computed based on the first computation path of the optimized fixed dimension combination.

Optionally, when computing the computation tasks, based on the fixed dimension combination and the first computation path of the optimized fixed dimension combination to activate the computation tasks, compared to the know technique wherein it is necessary to obtain data for computation from the source flow data when computing dimension combination, the solution of the present invention can greatly reduce the computation amount of the dimension combination. Optionally, the high level dimension combination (TopView) is first computed, wherein the TopView is a dimension combination directly generated from the received or pre-processed big data, such as, View_AB and View_AC of FIG. 2 as TopView. Then, other views are computed based on the recursion path.

Specifically, the step of based on the fixed dimensional combination and the computation path of the optimized fixed dimension combination, activating the computation tasks comprises:

A. based on the path recursion relation, grouping the fixed dimension combination of the first computation path of the optimized fixed dimension combination to obtain a first grouping. For example, the recursion topology of FIG. 2 is the recursion topology where the first computation path of the optimized fixed dimension combination is located, the grouping of the fixed dimension combination of the computation path of the optimized fixed dimension combination based on the path recursion relation is: dimension combination View_ABC can obtain to View_AB and View_AC from a recursion relation, View_AB can obtain View_A and View_B, View_AC can obtain View_C. As such, the first grouping may comprise five sub-groups: View_AB, View_AC, View_A, View_B, View_C.

B. When a same path recursion relation exists in the first grouping, merging the fixed dimension combinations with the same path recursion in the first grouping to obtain a second grouping;

Optionally, in the first grouping, View_ABC can obtain View_AB and View_AC, i.e., View_ABC is the common parent view of View_AB and View_AC, and therefore View_AB and View_AC may be merged for computation; similarly, View_AB can obtain View_A and View_B, so after finishing computing View_AB, View_A and View_B may be merged for computation. As such, the second grouping may comprise three sub-groups: View_AB and View_AC, View_A and View_B, and View_C.

C. following the path recursion relation and activating computing the computation tasks of each fixed dimension combination of the second grouping, multi-path to obtain the computation result.

Further optionally, performing parallel computation following the activated computation tasks, multi-path to obtain the computation result.

In computing each fixed dimension combination, the required dimension is computed and related row can be obtained from the wide table, and then compute according to algorithm selected based on the computation logic designated by the fixed dimension combination. Optionally, the computation can support multi-path merge, index accumulation, index accumulation with repetition, and so on. When using the above algorithms for computing, the known technique is used and will not be described here.

Optionally, after a parent view is generated, the child views that may be obtained by recursion from the parent view are listed and propagated and the computation of the child views are performed, wherein the child view list may be a list formed by a plurality of child views, and each child view list obtains related row from the parent view. The computation of the child view obtains the required row from the parent view and uses the designated algorithm to compute result of the child view.

In computing views, a computation may involve a plurality of views and the computation result may be outputted by multi-path.

Optionally, the embodiment of the present invention computes the computation tasks based on the fixed dimension combination and computation path of the fixed dimension combination so as to reduce the overall computation resource required to compute and to improve computation speed.

Further optionally, as shown in FIG. 4 of state transition of computation index, after pre-processing big data, the subsequent processing continues when the pre-processing is successful; otherwise, the pre-processing is repeated when the pre-processing fails. When the number of times of pre-processing operation reaches a default threshold and yet successful, the method terminates. On the other hand, when the number of times of pre-processing operation has yet reached a default threshold and the pre-processing is successful, the method continues.

Step 307: preserving the computation results obtained by multi-path in the corresponding table, and a computation result corresponding to a table.

A computation result corresponds to a table. In the present embodiment, the separation strategy of the landing view table is to separate the table for preservation based on view identity (ID), i.e., an outputted computation result from a view is preserved in a table.

Step 308: storing the computation results preserved in the tables in a distributed database, and preserving the key dimension combination in the computation result preserved in the tables in the memory, the key dimension combination comprising the dimension combination often queried by the user or the dimension combination used in the user default duration.

Optionally, the embodiment of the present invention preserves the computation result in a distributed database, and uses the big table of the distributed database to store, i.e., using an approach supporting row-storage to store computation result. The distributed database is a database with its data stored on different computers respectively in a computer network. The amount of data stored is large and query processing performance is better. It should be noted that when using an approach supporting row-storage to store computation result, the rows without data will not take up storage space, i.e., only rows with data will use storage resource. Compared to known technique, the storage resource is saved and only valid data is stored.

Optionally, the key dimension combination is preserved in memory for improving query speed and enhancing user experience.

Figure 5:
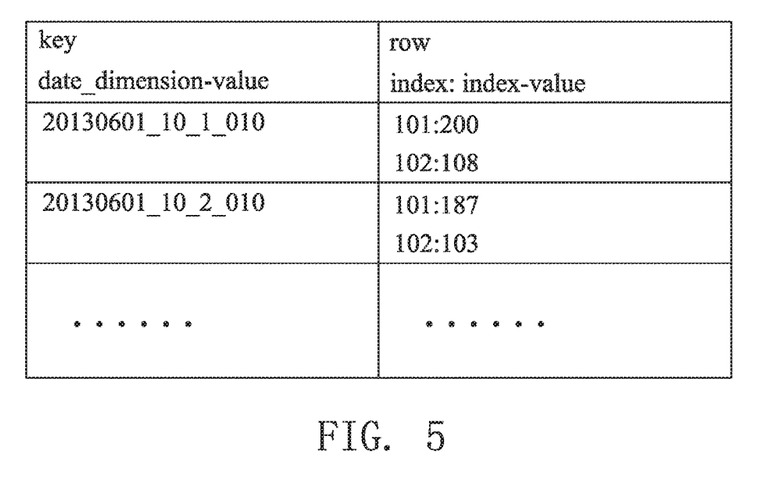
FIG. 5 is a schematic view showing the row storage according to an embodiment of the present invention.

Optionally, as shown in FIG. 5 of row-storage, the key stores a data date and view dimension values; and row stores index value corresponding to each index, wherein the data date is the date for obtaining the data, such as, 20130601_10_1_010 indicating that the data date is 2013/6/1, and the view dimension values are 10, 1 010, respectively, wherein the first dimension value may be the value of age, such as, the age is 10; the second dimension value may be the value of gender, such as, female as 1 and male as 2, indicating the user is female; and the third dimension value may be the value of address, such as, 101 for Beijing, indicating that the user address is Beijing. Optionally, the values of the attributes can be configured by default, wherein 101:200 indicates index ID_101 has the index value 200, such as, the index may indicate active users, and the number of current active users is 200. Similarly, 102:108 indicates index ID_102 has the index value 108.

Step 309: based on the data query request issued by the user, determining whether the distributed database or the memory stores the dimension combination data corresponding to the dimension combination to be queried.

The data query request comprises the dimension combination to be queried.

Optionally, the data query request issued by the user is received and the determined whether the distributed database or the memory stores the dimension combination data corresponding to the dimension combination to be queried. The distributed database preserves each fixed dimension combination and the memory preserves the key fixed dimension combination. When the distributed database or the memory stores the dimension combination data corresponding to the dimension combination to be queried, the query result can be obtained directly. When the distributed database or the memory does not store the dimension combination data corresponding to the dimension combination to be queried, the computing based on request must be activated, i.e., step 311.

Step 310: when the distributed database or the memory stores the dimension combination data corresponding to the dimension combination to be queried, the data query request is transmitted to the distributed database or the memory and the dimension combination data transmitted by the distributed database or the memory is received.

Step 311: when the distributed database or the memory does not store the dimension combination data corresponding to the dimension combination to be queried, at least a data query request issued by the user in the default duration is merged, and based on the fixed dimension combination and the computation path of the optimized fixed dimension combination, the computation tasks of the dimension combination are activated in a batch manner, and the computation tasks of the dimension combination are computed in a batch manner to obtain computation result.

Optionally, to improve computing speed, data query requests in a duration can be merged and the computation based on request is performed in a batch. The default duration may be 3 seconds, 5 seconds or others.

Furthermore, when executing batch computation based on requests, the computation may be executed according to the fixed dimension combination and the computation path of the optimized fixed dimension combination so as to improve the generation speed of views.

Further optionally, when activating computation based on requests, the computation results are preserved in the tables, and the list is preserved in a distributed database or preserved in a memory.

It should be noted that when the known technique is applied to analyzing the multi-dimension combination, such as taoboa and other well-known sites, for example, analyzing the number of active users of a default age, i.e., when analyzing the index of active user, the analysis is based on the default dimension of age. The method provided by the present invention can satisfy the user in using dimension combination to inquire so as to improve user experience.

The present invention provides a multi-dimensional decomposition computing method, by performing computation based on the fixed dimension combination and the computation path of the optimized fixed dimension combination, and preserving the computation result in a distributed database or memory so that the present invention can perform multi-dimensional decomposition computation to reduce computation complexity and improve access performance.

Figure 6:
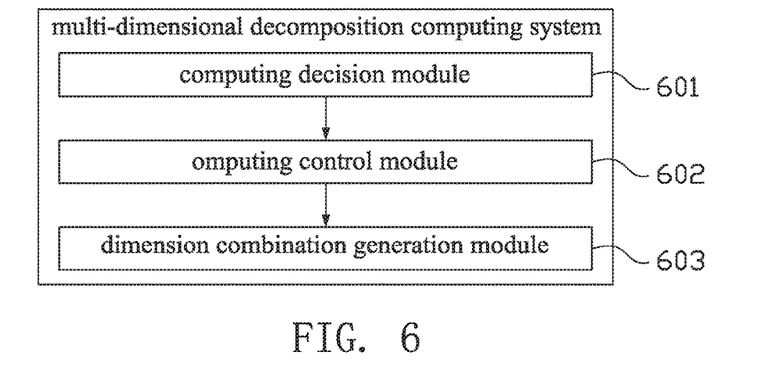
FIG. 6 is a schematic view showing a multi-dimensional decomposition computing system according to an embodiment of the present invention.

Another embodiment of the present invention provides a multi-dimensional decomposition computing system running in a server (e.g., the server shown in FIG. 8), as shown in FIG. 6, which comprises one or more processors, a memory, and a plurality of program modules stored in the memory and to be executed by the one or more processors, the plurality of program modules further comprises: a computing decision module 601, a computing control module 602 and a dimension combination generation module 603;

the computing decision module 601 is for generating an recursion topology based on pre-processed big data, the recursion topology comprises a plurality of dimension combinations and recursion paths between the plurality of dimension combinations, the dimension combination comprises an attribute name of each dimension and a data of the pre-processed data corresponding to the attribute name;

the computing decision module 601 is also for defining a fixed dimension combination and defining a computation path forming an optimized fixed dimension combination based on default fixed strategy;

the computing control module 602 is for generating computation tasks based on the recursion topology;

the computing control module 602 is also for activating the computation tasks based on the fixed dimensional combination and the computation path of the optimized fixed dimension combination; and the dimension combination generation module 603 is for computing the computation tasks and obtaining computing results.

Figure 7:
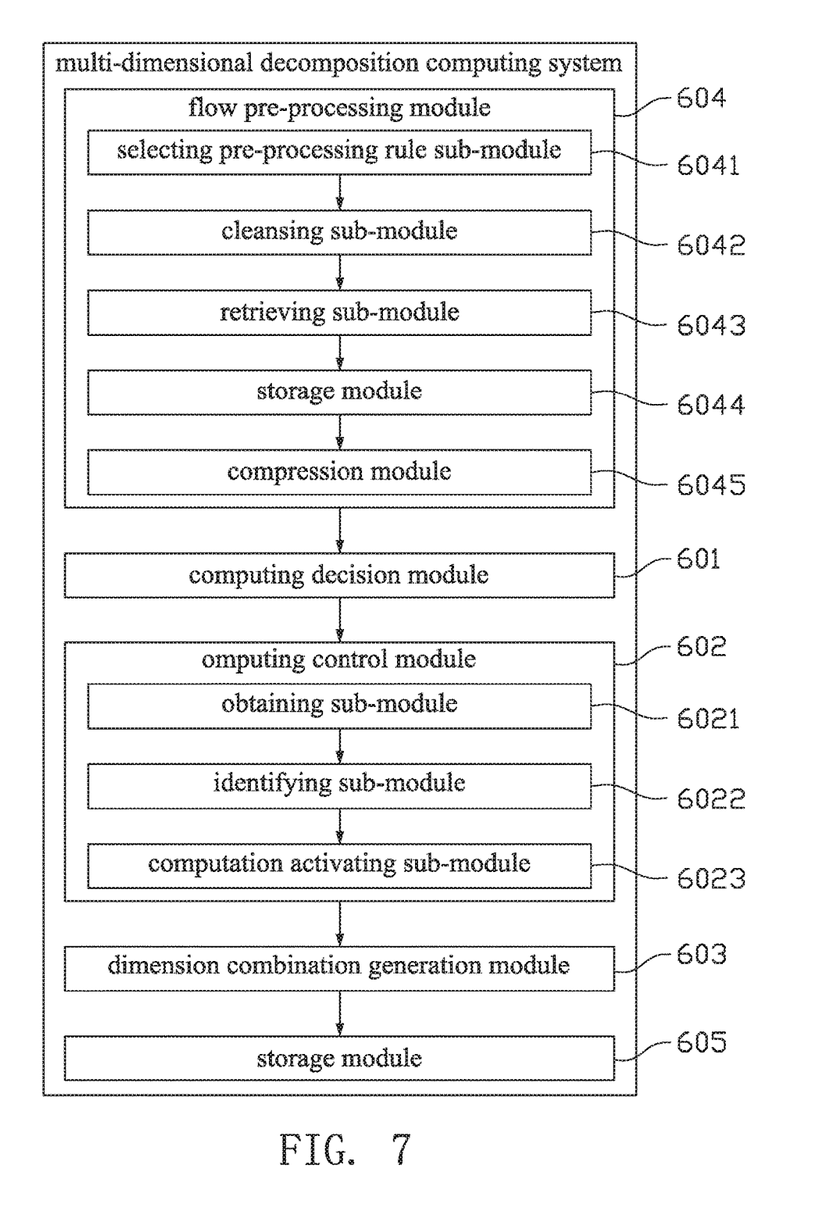
FIG. 7 is a schematic view showing a multi-dimensional decomposition computing system according to another embodiment of the present invention.

Further optionally, as shown in FIG. 7, the system further comprises a flow pre-processing module 604;

the flow pre-processing module 604 is for receiving the big data to be processed and flow pre-processing the big data received to be processed to obtain the pre-processed big data.

Optionally, the received big data may be a whole-day flow data of a user, or a flow data of a default duration defined by the user. The default duration can be defined according to past experience, such as, a week, 8 days, and so on. The received big data can be big data of the order of magnitude of terabytes (TB).

Optionally, the big data can be uploaded by the user through an interface, or the big data may be of a text format provided by the user.

Further optionally, the flow pre-processing module comprises: a selecting pre-processing rule sub-module 6041, a cleansing sub-module 6042, a retrieving sub-module 6043, a storage module 6044 and a compression module 6045;

the selecting pre-processing rule sub-module 6041 is for, based on the big data to be processed and the default selection pre-processing rules, identifying the pre-processing rule corresponding to the big data to be processed; optionally, the default selection pre-processing rules is to designate which pre-processing rules are used to pre-process the big data to be processed.

the cleansing sub-module 6042 is for, based on the default pre-processing rule, performing the cleansing processing on the big data to be processed to obtain a first processed data; optionally, based on the above default pre-processing rule, perform the cleansing processing on the big data to be processed, i.e., filtering the illegitimate field in the big data to be processed.

the retrieving sub-module 6043 is for, based on default retrieving field rules, retrieving at least a field or at least a field combination required by the multi-dimensional decomposition from the first processed data; optionally, the default retrieving field rule may be required retrieved field disposed according to experience, i.e., the required dimension combination retrieved respectively from the first processed data, the storage module 6044 is for, based on the retrieved at least a field or at least a field combination, generating a wide table, and preserving the at least a field or at least a field combination in the wide table; the wide table refers to a table storing data in a row format, i.e., each field occupying a row in the wide table for storing.

the compression module 6045 is for, compressing the at least a field or at least a field combination preserved in the wide table to obtain the pre-processed big data.

Optionally, the compression module 6045 is for, using a light-weight approach to compress the at least a field or at least a field combination preserved in the wide table to obtain the pre-processed big data.

Further optionally, as shown in FIG. 7, the computing control module 602 activates the computation tasks based on the fixed dimensional combination and the computation path of the optimized fixed dimension combination, and the computing control module 602 comprises: an obtaining sub-module 6021, an identifying sub-module 6022, a computation activating sub-module 6023;

the obtaining sub-module 6021 is for obtaining the fixed dimension combination;

the identifying sub-module 6022 is for identifying the fixed dimension combination to be computed based on the obtained fixed dimension combination;

the identifying sub-module 6022 is also for, based on the fixed dimension combination to be computed, identifying a first computation path of the optimized fixed dimension combination, the computation path of the optimized fixed dimension combination comprising the first computation path of the optimized fixed dimension combination;

the computation activating sub-module 6023 is for, based on the first computation path of the optimized fixed dimension combination, activating the computation tasks.

Further optionally, the computation activating sub-module is for activating the computation tasks based on the first computation path of the optimized fixed dimension combination, and comprises a grouping unit, a merging unit and an activating unit. It should be noted that the units of the computation activating sub-module is not shown in FIG. 7.

The grouping unit is for, based on the path recursion relation, grouping the fixed dimension combination of the first computation path of the optimized fixed dimension combination to obtain a first grouping.

The merging unit is for, when a same path recursion relation exists in the first grouping, merging the fixed dimension combinations with the same path recursion in the first grouping to obtain a second grouping.

The activating unit is for, following the path recursion relation and activating computing the computation tasks of each fixed dimension combination of the second grouping, multi-path to obtain the computation result.

Optionally, the dimension combination generation module 603 is for performing parallel computation following the activated computation tasks, multi-path to obtain the computation result.

Further optionally, as shown in FIG. 7, the system further comprises: the storage module 605;

After the dimension combination generation module 603 performing parallel computation following the activated computation tasks, multi-path to obtain the computation result, the storage module 605 is for preserving the computation results obtained by multi-path in the corresponding table, and a computation result corresponding to a table.

Further optionally, after preserving the computation results obtained by multi-path in the corresponding table, the storage module 605 is for: storing the computation results preserved in the tables in a distributed database, and preserving the key dimension combination in the computation result preserved in the tables in the memory, the key dimension combination comprising the dimension combination often queried by the user or the dimension combination used in the user default duration.

Optionally, the embodiment of the present invention preserves the computation result in a distributed database, and uses the big table of the distributed database to store, i.e., using an approach supporting row-storage to store computation result. The distributed database is a database with its data stored on different computers respectively in a computer network. The amount of data stored is large and query processing performance is better. It should be noted that when using an approach supporting row-storage to store computation result, the rows without data will not take up storage space, i.e., only rows with data will use storage resource. Compared to known technique, the storage resource is saved and only valid data is stored.

Further optionally, when receiving data query request issued by the user, the computing control module 602 is also for, based on the data query request issued by the user, determining whether the distributed database or the memory stores the dimension combination data corresponding to the dimension combination to be queried. The data query request comprises the dimension combination to be queried.

The computing control module 602 is also for, when the distributed database or the memory stores the dimension combination data corresponding to the dimension combination to be queried, transmitting the data query request to the distributed database or the memory and receiving the dimension combination data transmitted by the distributed database or the memory.

The computing control module 602 is also for, when the distributed database or the memory does not store the dimension combination data corresponding to the dimension combination to be queried, merging at least a data query request issued by the user in the default duration, and based on the fixed dimension combination and the computation path of the optimized fixed dimension combination, activating the computation tasks of the dimension combination in a batch manner, and the computation tasks of the dimension combination are computed in a batch manner to obtain computation result.

The dimension combination generation module 603 is also for, executing the computation tasks of the dimension combination in a batch to obtain computation results.

Further optionally, the system may further comprises a central control module, responsible for the linking of the sub-processes, retrial of the sub-processes when failing, issuing warning, and so on.

It should be noted that in the system shown in FIGS. 6 and 7, the specific embodiment of each module and the information exchange between modules can refer to the embodiment of the method of the present invention as both are based on the same inventive concept. No description will be repeated here.

The present invention provides a multi-dimensional decomposition computing system, by performing computation based on the fixed dimension combination and the computation path of the optimized fixed dimension combination, and preserving the computation result in a distributed database or memory so that the present invention can perform multi-dimensional decomposition computation to reduce computation complexity and improve access performance.

It should be noted that the above description of the system embodiment is only illustrative, wherein the separate parts or units may or may not be physically separable. The parts of the display unit may or may not be physical unit, may be located at one place or distributed in a plurality of network units. The present invention may be embodied depending on the actual application in part or in entirety. Those with ordinary skills may understand and practice of the present invention without creative efforts.

Through the above description of the embodiments, those with ordinary skills in the field may understand that the present invention may be realized by a combination of software and common hardware, or by specific hardware, such as, ASIC, specific CPU, specific memory, specific elements. However, the former approach may be better in various conditions. As such, the technical features of the present invention may be embodied in a software format, and the computer software is stored in a readable medium, such as, floppy disk, U disk, portable harddisk, ROM, RAM, CD and so on, comprising a plurality of instruction to command a computer (such as, PC, server or network device, and so on) to execute the method in the embodiments of the present invention.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A multi-dimensional decomposition computing method, which comprises:
   based on pre-processed big data, generating topology, the recursion topology comprising a plurality of dimension combinations and recursion paths between the plurality of dimension combinations, the dimension combination comprising an attribute name of each dimension and a data of the pre-processed data corresponding to the attribute name;
   based on default fixed strategy, defining a fixed dimension combination and defining a computation path forming an optimized fixed dimension combination;

based on the recursion topology, generating a first set of computation tasks;

based on the fixed dimension combination and the computation path of the optimized fixed dimension combination, activating the first set of computation tasks, computing the first set of computation tasks to obtain computation results;

preserving the computation results in corresponding tables, each of the computation results corresponding to one table;

storing the computation results preserved in the corresponding tables in a distributed database;

storing a key dimension combination corresponding to a key combination data of the computation results in a row-storage format in a memory device, wherein the key dimension combination includes: a key storing a data date and a view dimension value, and a row storing an index value corresponding to an index;

based on a data query request with a dimension combination, determining whether the memory device or the distributed database stores a dimension combination data corresponding to the dimension combination in the data query request;

when the dimension combination in the data query request matches the view dimension value of the key dimension combination, determining that the memory device stores the dimension combination data corresponding to the dimension combination in the data query request, transmitting the data query request to the memory device, and receiving the key dimension combination data transmitted by the memory device;

when the dimension combination in the data query request does not match the view dimension value of the key dimension combination, and when the distributed database stores the dimension combination data corresponding to the dimension combination in the data query request, transmitting the data query request to the distributed database and receiving the dimension combination data from the distributed database;

when neither the distributed database nor the memory device stores the dimension combination data corresponding to the dimension combination in the data query request, merging the data query with at least one other data query request in a default duration to form a merged data query request; and after forming the merged data query quest, based on the fixed dimension combination and the computation path forming the optimized fixed dimension combination, activating a second set of computation tasks according to the merged data query request in a batch manner, and performing the second set of computation tasks.

2. The method according to claim 1, wherein before the step of, based on pre-processed big data, generating topology, the method further comprises:

receiving big data to be processed; and flow pre-processing the big data received to be processed to obtain the pre-processed big data, and the pre-processed big data being data of different attributes.

3. The method according to claim 2, wherein the step of flow pre-processing the big data received to be processed to obtain the pre-processed big data further comprises:

based on the big data to be processed and the default selection pre-processing rules, the pre-processing rule corresponding to the big data to be processed is identified;

based on the default pre-processing rule, the cleansing processing is performed on the big data to be processed to obtain a first processed data;

based on default retrieving field rules, retrieving at least a field or at least a field combination required by the multi-dimensional decomposition from the first processed data;

based on the retrieved at least a field or at least a field combination, generating a wide table, and preserving the at least a field or at least a field combination in the wide table; and compressing the at least a field or at least a field combination preserved in the wide table to obtain the pre-processed big data.

4. The method according to claim 3, wherein the step of compressing the at least a field or at least a field combination preserved in the wide table to obtain the pre-processed big data further comprises:

compressing the at least a field or at least a field combination preserved in the wide table with a light-weight approach to obtain the pre-processed big data.

5. The method according to claim 1, wherein the step of based on the fixed dimension combination and the computation path of the optimized fixed dimension combination, activating the first set of computation tasks further comprises:

obtaining the fixed dimension combination and identifying the fixed dimension combination to be computed;

based on the fixed dimension combination to be computed, identifying a first computation path of the optimized fixed dimension combination, the computation path of the optimized fixed dimension combination comprising the first computation path of the optimized fixed dimension combination; and based on the first computation path of the optimized fixed dimension combination, activating the first set of computation tasks.

6. The method according to claim 5, wherein the step of based on the first computation path of the optimized fixed dimension combination, activating the first set of computation tasks further comprises:

based on the path recursion relation, grouping the fixed dimension combination of the first computation path of the optimized fixed dimension combination to obtain a first grouping;

when a same path recursion relation exists in the first grouping, merging the fixed dimension combinations with the same path recursion in the first grouping to obtain a second grouping; and following the path recursion relation and activating computing the first set of computation tasks of each fixed dimension combination of the second grouping, multi-path to obtain the computation result.

7. The method according to claim 6, wherein the step of computing the first set of computation tasks to obtain the computation results further comprises:

performing parallel computation following the activated first set of computation tasks, multi-path to obtain the computation result.

8. A multi-dimensional decomposition computing system, which comprises:

one or more processors; and memory;

wherein the one or more processors are configured to perform:

generating topology based on pre-processed big data, the recursion topology comprises a plurality of dimension combinations and recursion paths between the plurality of dimension combinations, the dimension combination comprises an attribute name of each dimension and a data of the pre-processed data corresponding to the attribute name;
defining a fixed dimension combination and defining a computation path forming an optimized fixed dimension combination based on default fixed strategy;
generating a first set of computation tasks based on the recursion topology;
activating the first set of computation tasks based on the fixed dimension combination and the computation path of the optimized fixed dimension combination;
computing the first set of computation tasks and to obtain computation results;
preserving the computation results in corresponding tables, each of the computation results corresponding to one table;
storing the computation results preserved in the corresponding tables in a distributed database;
storing a key dimension combination corresponding to a key combination data of the computation results in a row-storage format in a memory device, wherein the key dimension combination includes: a key storing a data date and a view dimension value, and a row storing an index value corresponding to an index;
based on a data query request with a dimension combination, determining whether the memory device or the distributed database stores a dimension combination data corresponding to the dimension combination in the data query request;
when the dimension combination in the data query request matches the view dimension value of the key dimension combination, determining that the memory device stores the dimension combination data corresponding to the dimension combination in the data query request, transmitting the data query request to the memory device, and receiving the key dimension combination data corresponding to the key dimension combination transmitted by the memory device;
when the dimension combination in the data query request does not match the view dimension value of the key dimension combination, when the distributed database stores the dimension combination data corresponding to the dimension combination in the data query request, transmitting the data query request to the distributed database and receiving the dimension combination data from the distributed database;
when neither the distributed database nor the memory device stores the dimension combination data corresponding to the dimension combination in the data query request,
merging the data query with at least one other data query request in a default duration to form a merged data query request; and
after forming the merged data query quest, based on the fixed dimension combination and the computation path forming the optimized fixed dimension combination, activating a second set of computation tasks according to the merged data query request in a batch manner, and performing the second set of computation tasks.

9. The system according to claim 8, wherein the one or more processors are further configured to perform:
receiving the big data to be processed and flow pre-processing the big data received to be processed to obtain the pre-processed big data; the pre-processed big data is the data representing different attributes.

10. The system according to claim 9, wherein the one or more processors are further configured to perform:
based on the big data to be processed and the default selection pre-processing rules, identifying the pre-processing rule corresponding to the big data to be processed;
based on the default pre-processing rule, performing the cleansing processing on the big data to be processed to obtain a first processed data;
based on default retrieving field rules, retrieving at least a field or at least a field combination required by the multi-dimensional decomposition from the first processed data;
based on the retrieved at least a field or at least a field combination, generating a wide table, and preserving the at least a field or at least a field combination in the wide table; and
compressing the at least a field or at least a field combination preserved in the wide table to obtain the pre-processed big data.

11. The system according to claim 10, the one or more processors are further configured to perform:
using a light-weight approach to compress the at least a field or at least a field combination preserved in the wide table to obtain the pre-processed big data.

12. The system according to claim 8, wherein the one or more processors are further configured to perform:
obtaining the fixed dimension combination;
identifying the fixed dimension combination to be computed based on the obtained fixed dimension combination;
based on the fixed dimension combination to be computed, identifying a first computation path of the optimized fixed dimension combination, the computation path of the optimized fixed dimension combination comprising the first computation path of the optimized fixed dimension combination; and
based on the first computation path of the optimized fixed dimension combination, activating the first set of computation tasks.

13. The system according to claim 12, wherein the one or more processors are further configured to perform:
based on the path recursion relation, grouping the fixed dimension combination of the first computation path of the optimized fixed dimension combination to obtain a first grouping;
when a same path recursion relation exists in the first grouping, merging the fixed dimension combinations with the same path recursion in the first grouping to obtain a second grouping; and
following the path recursion relation and activating computing the first set of computation tasks of each fixed dimension combination of the second grouping, multi-path to obtain the computation result.

14. The system according to claim 13, the one or more processors are further configured to perform:
performing parallel computation following the activated first set of computation tasks, multi-path to obtain the computation result.

15. The method according to claim 1, wherein defining the fixed dimension combination comprises:
obtaining a configuration information from a configuration table in the distributed database, and
using the configuration information as the fixed dimension combination.

* * * * *